United States Patent Office.

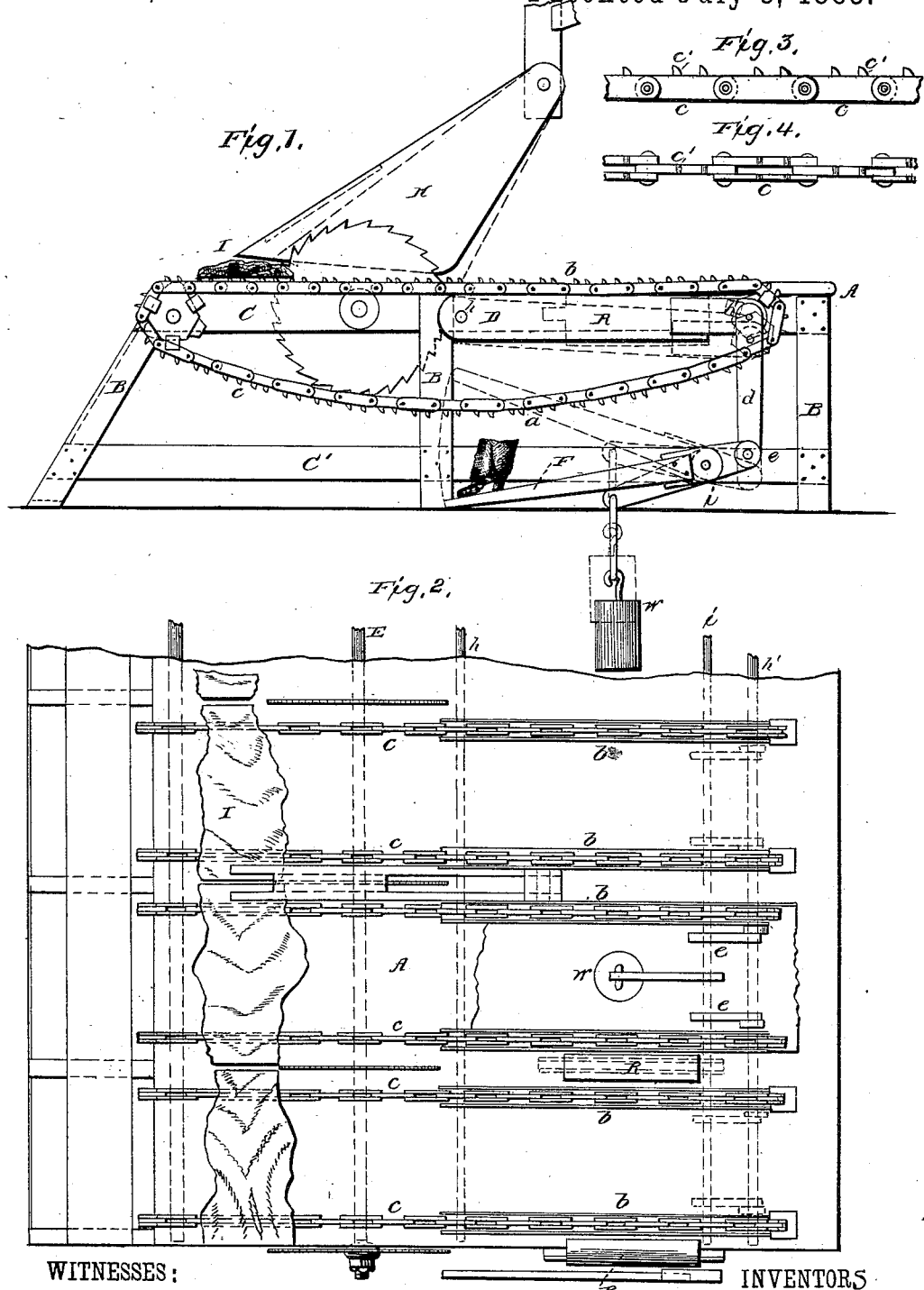

WILLIAM A. DOHERTY AND CHARLES G. VAN SICKEL, OF MUSKEGON, MICH.

CROSSCUT-SAWING MACHINE.

SPECIFICATION forming part of Letters Patent No. 280,457, dated July 3, 1883.

Application filed December 30, 1882. (No model.)

*To all whom it may concern:*

Be it known that we, WILLIAM A. DOHERTY and CHARLES G. VAN SICKEL, citizens of the United States, residing at Muskegon, in the county of Muskegon and State of Michigan, have invented certain new and useful Improvements in Crosscut-Sawing Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The nature of our invention is to so improve cross-cutting machinery of one or more saws used for the cutting of slabs, edgings, or unedged lumber, or any crooked-edged material connected with the manufacture or manipulation of lumber, that it shall hold firmly and carry the material to be cut to and past the saws in such a manner as to let no part of it slip backward and bind the saws, as it sometimes does in the machines now used for this purpose. We attain these objects by the mechanism illustrated in the accompanying drawings, in which—

Figure 1 is an end elevation of the entire machine. Fig. 2 is a top view of a part of the machine as it appears with four saws in place. Fig. 3 is a side view of the chain used to carry forward the material to be cut. Fig. 4 is a plan of the chain.

Similar letters refer to like parts throughout the different figures.

The top of the table A is supported by standards B B and strengthened by girts C and C', secured to the under side of the table and also to the standards, thus constituting the frame-work of the machine. This frame-work also carries the saw-arbor E, which is provided with any desired number of saws, placed at suitable distances apart to cut the material to any desired lengths. A shaft, $k$, is also supported thereon, which is provided with a series of sprocket-wheels carrying the endless chains $c$ $c$, which are provided with teeth $c'$, all pointing in one direction, said chains being supported in part by channels formed in the top of the table A, and the remaining part, as they pass over the table at $b$, by the levers D, which allow the chains to drop below the top of the table, when the levers are lowered into the position shown by dotted lines at $a$ and $a'$. These levers D are hung at one end on a shaft, $h$, and their opposite ends are connected to the upright links $d$ by means of a shaft, $h'$, passing through and connecting the whole of the links and levers, so as to move all simultaneously when pressure is brought to bear on the foot-lever F, as shown in Fig. 1 of the drawings. The counter-weight W, arranged as shown, partially counterbalances the chains, levers, links, and shafts, so as to relieve the pressure that would otherwise have to be applied to foot-lever F when it was desired to raise the chains. The rock-shaft $i$, to which the foot-lever is attached, carries the rocker-arms $e$ $e$, actuates the links, and also the lever D.

The operation of the machine is as follows: The material to be sawed is either passed onto the machine at the end, in which case rollers are used, as shown at R R in Fig. 2 of the drawings, or if it is to be thrown onto the machine at the side, the rollers are dispensed with and the material is put directly on the top or table. After the material to be sawed is satisfactorily arranged by the operators, the lever F, standing normally in the position shown by dotted lines $a'$, is depressed to the position shown in full lines, thus causing the chains to rise above the top of the rollers or table, as the case may be, thereby causing the sharp spikes or teeth of the chains to take a firm and unrelenting hold of the material. To make the hold of the teeth more sure, and thus further the desired end, the swinging presser-feet H are hung over the chains at or near the front side of the saw or saws, and are so formed that they have a bearing on the material until after it has passed the saws. In the figures of the drawings, I represents a slab as it lies on the chains in passing over the table during the process of sawing the same.

It will be understood that motion is imparted to the saws and to the shafts carrying the sprocket-wheels, which drive the endless chains in any suitable manner, from the shafting propelled by the engine which gives motion to the other parts of the mill.

We are aware that cross-cutting sawing-machines with carrying-chains have been used prior to our invention. We therefore do not claim such chains, broadly; but What we do claim, and desire to secure by Letters Patent, is as follows:

1. In a crosscut-sawing machine, the combination of the slotted table A, and the endless toothed chains supported partly in grooves formed in the surface of said table and partly by vibrating levers connected by suitable links and levers to a balance-weight, W, all arranged and operating in the manner shown and described.

2. In a crosscut-sawing machine, the table A, having longitudinal channels to receive and guide the endless carrying-chains, and having slots or openings to allow said chains to drop beneath the surface of the table when not required for carrying material to the saws, substantially as set forth.

In testimony whereof we affix our signatures in presence of two witnesses.

WILLIAM A. DOHERTY.
   CHAS. G. VAN SICKEL.

Witnesses:
 R. A. FLEMING,
 A. C. McLAUGHLIN.